United States Patent
McNamara et al.

(10) Patent No.: US 7,246,746 B2
(45) Date of Patent: Jul. 24, 2007

(54) INTEGRATED REAL-TIME AUTOMATED LOCATION POSITIONING ASSET MANAGEMENT SYSTEM

(75) Inventors: Paul Thomas McNamara, Killarney Heights (AU); Muneyb Minhazuddin, Quakers Hill (AU); Christopher Alexander Fegan, Darlington (AU); Rohan Lenard, Birchgrove (AU); Ralph Warta, Lane Cove (AU)

(73) Assignee: Avaya Technology Corp., Basking Ridge, NJ (US)

( * ) Notice: Subject to any disclaimer, the term of this patent is extended or adjusted under 35 U.S.C. 154(b) by 186 days.

(21) Appl. No.: 10/911,090

(22) Filed: Aug. 3, 2004

(65) Prior Publication Data

US 2006/0028352 A1    Feb. 9, 2006

(51) Int. Cl.
*G06F 19/00* (2006.01)
(52) U.S. Cl. .............. 235/385; 235/383; 235/492; 235/435; 455/456.1; 340/10.1
(58) Field of Classification Search .......... 235/385, 235/435, 376
See application file for complete search history.

(56) References Cited

U.S. PATENT DOCUMENTS

| | | | |
|---|---|---|---|
| 4,074,069 A | 2/1978 | Tokura et al. | |
| 4,275,385 A | 6/1981 | White | |
| 5,206,903 A | 4/1993 | Kohler et al. | |
| 5,315,434 A | 5/1994 | Mizuno et al. | |
| 5,555,376 A | 9/1996 | Theimer et al. | |
| 5,627,375 A | 5/1997 | Hsieh | |
| 5,680,450 A | 10/1997 | Dent et al. | |
| 5,689,548 A | 11/1997 | Maupin et al. | |
| 5,742,666 A | 4/1998 | Alpert | |
| 5,793,861 A | 8/1998 | Haigh | |
| 5,805,999 A * | 9/1998 | Inoue | 455/462 |
| 5,828,747 A | 10/1998 | Fisher et al. | |
| 5,905,659 A | 5/1999 | Rose | |
| 5,905,793 A | 5/1999 | Flockhart et al. | |
| 5,960,061 A | 9/1999 | Fahie et al. | |

(Continued)

FOREIGN PATENT DOCUMENTS

| | | |
|---|---|---|
| EP | 0899673 | 3/1999 |
| EP | 0998108 | 5/2000 |
| EP | 1091307 | 4/2001 |
| EP | 1150236 | 10/2001 |
| JP | 2004013789 | 1/2004 |
| WO | WO 01/95642 | 12/2001 |
| WO | 2004/092999 | 10/2004 |
| WO | WO 2005001669 | 1/2005 |

OTHER PUBLICATIONS

U.S. Appl. No. 10/652,914, filed Aug. 28, 2003, Gentle et al.

(Continued)

*Primary Examiner*—Seung Ho Lee
(74) *Attorney, Agent, or Firm*—Sheridan Ross P.C.

(57) ABSTRACT

An enterprise network 100 for tracking objects is provided. The network 100 includes: (a) a plurality of subscriber communication devices 134 and 138; (b) a plurality of readers 160, each of the communication devices being in communication with a corresponding reader, wherein each reader is operable to read a set of object identifiers, each object identifier in the set corresponding to an Identification device 168 positioned on a respective object 164; and (c) a location agent 324 operable to determine, from at least one of the sets of object identifiers, a physical location of each object 164 having an object identifier in the at least one of the sets of object identifiers.

30 Claims, 4 Drawing Sheets

U.S. PATENT DOCUMENTS

| | | | |
|---|---|---|---|
| 5,982,873 | A | 11/1999 | Flockhart et al. |
| 6,067,017 | A | 5/2000 | Stewart et al. |
| 6,076,121 | A | 6/2000 | Levine |
| 6,100,806 | A | 8/2000 | Gaukel |
| 6,104,288 | A | 8/2000 | Hopkins |
| 6,173,053 | B1 | 1/2001 | Bogart et al. |
| 6,192,122 | B1 | 2/2001 | Flockhart et al. |
| 6,236,365 | B1 | 5/2001 | LeBlanc et al. |
| 6,249,227 | B1 | 6/2001 | Brady et al. |
| 6,265,963 | B1 | 7/2001 | Wood, Jr. |
| 6,275,794 | B1 | 8/2001 | Benyassine et al. |
| 6,310,549 | B1 | 10/2001 | Loftin et al. |
| 6,362,778 | B2 | 3/2002 | Neher |
| 6,449,358 | B1 | 9/2002 | Anisimov et al. |
| 6,453,291 | B1 | 9/2002 | Ashley |
| 6,456,964 | B2 | 9/2002 | Manjunath et al. |
| 6,463,607 | B2 | 10/2002 | Hartmann |
| 6,486,780 | B1 | 11/2002 | Garber et al. |
| 6,504,838 | B1 | 1/2003 | Kwan |
| 6,580,908 | B1 | 6/2003 | Kroll et al. |
| 6,600,443 | B2 | 7/2003 | Landt |
| 6,650,901 | B1 | 11/2003 | Schuster et al. |
| 6,678,357 | B2 | 1/2004 | Stumer et al. |
| 6,687,609 | B2 | 2/2004 | Hsiao et al. |
| 6,687,668 | B2 | 2/2004 | Kim et al. |
| 6,694,787 | B1 | 2/2004 | Brown |
| 6,705,522 | B2 | 3/2004 | Gershman et al. |
| 6,707,383 | B2 | 3/2004 | Flaherty |
| 6,757,359 | B2 | 6/2004 | Stumer et al. |
| 6,778,084 | B2 | 8/2004 | Chang et al. |
| 6,778,096 | B1 * | 8/2004 | Ward et al. ............ 340/825.51 |
| 6,804,329 | B2 | 10/2004 | Geck et al. |
| 6,825,767 | B2 | 11/2004 | Humbard |
| 6,898,434 | B2 | 5/2005 | Pradhan et al. |
| 6,907,238 | B2 | 6/2005 | Leung |
| 6,990,328 | B2 | 1/2006 | Crandall et al. |
| 7,005,985 | B1 * | 2/2006 | Steeves .................. 340/572.1 |
| 7,015,817 | B2 | 3/2006 | Copley et al. |
| 7,027,564 | B2 | 4/2006 | James |
| 7,030,731 | B2 * | 4/2006 | Lastinger et al. .......... 340/10.1 |
| 2002/0103636 | A1 | 8/2002 | Tucker et al. |
| 2002/0165711 | A1 | 11/2002 | Boland |
| 2002/0167405 | A1 | 11/2002 | Shanks et al. |
| 2002/0173328 | A1 | 11/2002 | Min |
| 2003/0152212 | A1 | 8/2003 | Burok et al. |
| 2004/0002305 | A1 | 1/2004 | Byman-Kivivuori et al. |
| 2004/0029558 | A1 | 2/2004 | Liu |
| 2004/0134984 | A1 | 7/2004 | Powell et al. |
| 2004/0135674 | A1 | 7/2004 | Shanks et al. |
| 2004/0142678 | A1 | 7/2004 | Krasner |
| 2004/0203352 | A1 | 10/2004 | Hall et al. |
| 2005/0083911 | A1 | 4/2005 | Grabelsky et al. |
| 2005/0088299 | A1 | 4/2005 | Bandy et al. |
| 2006/0121916 | A1 | 6/2006 | Aborn et al. |

OTHER PUBLICATIONS

Active Campus Tutorial by David Casteron dated Oct. 11, 2003, downloaded from http://activecampus-dev.ucsd.edu/ntutorial/main.htm on Apr. 12, 2005.

Project Mayhem by Phillip Dressen, James Gillespie, Benjamin Hoyt and Simone Nicolo, downloaded freom http://www.cs.colorado.edu/upgrad/seniorproject/projects/projectmahhem.html on Apr. 12, 2005.

Mobile in a Minute downloaded from www.mobilein.com/location_based_services.htm on Apr. 12, 2005.

Location Based Services downloaded from http://www.ericsson.com/telecomreport/article.asp?aid=34&tid=tid=201&ma=1&msa=3 on Apr. 12, 2005.

Applied Generics Technical Report "NERO24 Mobile Location System (GSM Edition)," Version 1.0 (2004), pp. 1-27.

U.S. Appl. No. 10/607,414, filed Jun. 23, 2003, Becker et al.

U.S. Appl. No. 10/795,119, filed Mar. 5, 2004, Moon et al.

RFID Journal, *Frequently Asked Questions*, Manufacturing, available at http://www.rfidjournal.com/article/articleview/207, 7 pages.

AIM, *RFID.ORG*, Searching for RFID Information, available at http://www.aimglobal.org/technologies/rfid, 3 pages.

Wyse, *RFID*, available at http://searchnetworking.techtarget.com/sDefinition/0,,sid7_gcl805987,00.html, 2 pages (updated Jan. 16, 2004).

Time Online Edition, *Global Business—The See-It-All Chip*, available at http://www.time.com/time/globalbusiness/article/0,9171,1101030922-485764-3,00.html, 3 pages (Sep. 22, 2003).

Wired News, *Radio ID Tags: Beyond Bar Codes*, available at http://www.wired.com/news/technology/0,1282,52343,00.html, 3 pages (May 20, 2002).

Newsweek, *An Internet of Things—Is RFID the Mark of Satan. . .*, available at http://msnbc.msn.com/id/3068871, 4 pages (Jun. 10, 2004).

RFID, *Tracking Everything, Everywhere*, by Katherine Albrecht, available at http://www.stoprfid.org/rfid_overview.htm, 7 pages.

RFID, *Wikipedia, the free encyclopedia*, available at http://en.wiklpedia.org/wiki/RFID, 3 pages (Updated May 31, 2004).

The Denver Post, *Bar Code Meets Its Match*, Section C, (Jun. 3, 2004), p. 1C and 8C.

Cisco Systems, Inc., *Cisco Emergency Responder* Version 1.1 (Oct. 2001), 5 pages.

Avaya: Communication without Boundaries, *Solving the Challenges of E911 Service with Avaya IP Telephony Networks*, White Paper, Nov. 2002, Issue 1.1, 10 pages.

Cisco Data Sheet, *Cisco Emergency Responder* Version 1.1, Jul. 20, 2002, available at http://www.cisco.com/warp/public/cc/pd/unco/cer/prodlit/emerg_ds.htm, 7 pages.

Cisco, *Cisco Emergency Responder*, printed Feb. 11, 2003, available at http://www.cisco.com/warp/public/cc/pd/unco/cer/, 2 pages.

EIA Telecommunications Industry Association, *TIA Telecommunications Systems Bulletin: Telecommunications—IP Telephony Infrastructures—IP Telephony Support for Emergency Calling Service*, TSB-146, Mar. 2003, pp. 1-30.

RedSky Technologies, Inc.; "Welcome to RedSky's E-911 Business Watch" *E-911 Business Watch*, Issue 4 (Oct. 21, 2003), 5 pages.

U.S. Appl. No. 10/810459, inventor Orbach

Avaya "Administrator's Guide for Avaya Communication Manager: vols. 1, 2, and 3," 555-533-506, Issue 7 (Nov. 2003), pp. 121, 129, 886, 889, 1169, 1193, 1555.

Cisco Systems, Inc., Cisco Emergency Responder Version 1.1 (Oct. 2001), 5 pages.

Comments of Nortel Networks, Before the Federal Communications Commission, WC Docket No. 04-36, May 28, 2004, pp. 1-22 with Appendices 1-4.

Khaled El-Maleh et al., "Comparison of Voice Activity Detection Algorithms for Wireless Personal Communications Systems," McGill University, Department of Electrical Engineering (1997), pp. 1-26.

Nikos Doukas et al., "Voice Activity Detection Using Source Separation Techniques", Signal Processing Section, Dept. of Electrical Engineering, Imperial College, UK, four (4) pages; undated.

Schulzrinne, "Providing Emergency Call Services for SIP-based Internet Telephony", Available at: http://www.iptel.org/info/players/ietf/location/draft-schulzrinne-sip-911--00.txt, Jul. 2000, pp. 1-14.

* cited by examiner

INTEGRATED REAL-TIME AUTOMATED LOCATION POSITIONING ASSET MANAGEMENT SYSTEM

CROSS REFERENCE TO RELATED APPLICATION

Cross reference is made to U.S. patent application Ser. Nos. 10/795,119, filed Mar. 5, 2004, entitled "Advanced Port-Based E911 Strategy for IP Telephony" and Ser. No. 10/607,414, filed Jun. 25, 2003, entitled "Universal Emergency Number ELIN Based on Network Address Ranges", each of which is incorporated herein by this reference.

FIELD OF THE INVENTION

The invention relates generally to object tracking and particularly to object tracking using a communications network.

BACKGROUND OF THE INVENTION

Automatic identification systems, such as asset management and security systems, are becoming increasingly important in the workplace of today. Automatic identification systems refer to a host of technologies used to assist machines in identifying objects, such as assets and people. Automatic identification is typically coupled with data capture. In other words, companies want to identify items, capture information about the objects, and somehow get the data into a computer without having employees type it in, thereby increasing efficiency, reducing data entry errors, and freeing up staff to perform more value-added functions. Automatic identification systems are important for a number of reasons, including to combat rising levels of theft, reduce inventory control costs in manufacturing and/or retail and wholesale businesses, and combat increasing threats of terrorism. There are a number of technologies falling under the automatic identification umbrella, including bar codes, smart cards, voice recognition technologies, biometric technologies (such as retina scans), optical character recognition technologies, Radio Frequency IDentification or RFID systems, magneto-acoustic systems, and other technologies.

RFID, in particular, is gaining wide acceptance as a highly effective and inexpensive automatic identification methodology. RFID is a generic term for technologies that use radio waves to identify automatically objects. Passive and active RFID transponders or tags contain coiled antennas to enable them to receive and respond to radio-frequency queries from an RFID reader or transceiver (which also includes an antenna). The transceiver converts the radio waves returned from the RFID tag into a form that can be passed onto computers. Typically, a serial number that identifies a product uniquely, and sometimes other information, is stored on the RFID tag (which can store up to 2 KB of data). Passive RFID tags do not have a power supply. A minute electrical current induced in an antenna by the incoming radio-frequency scan provides enough power for the tag to send a response. Active RFID tags have an on-board power source and may have longer ranges and larger memories than passive tags and the ability to store additional information sent by the transceiver. Semi-passive RFID tags use an on-board power source to run the tag's circuitry but communicate by drawing power from the transceiver. Chips in RFID tags can be read-write or read-only.

Automatic identification systems can have disadvantages. For example, they typically require either movement of equipment or people past scanners (e.g., palettes leaving a warehouse or airline passengers moving past a magnetic detector) or employees around a facility to verify manually that the data matches the records (e.g., stock takes). For equipment that is on the floor, under desks, behind monitors, and the like, these techniques can be difficult and require personnel to collect physically the desired information. Use of manual scanners are also slow and practically impossible to maintain current asset location information. Moreover, Local Area Networks or LAN's for automatic identification systems are not widely used due to the high cost and installation expenses of the cabling necessary to support the LAN.

Tools, such as Avaya Inc.'s ExpertNet Discovery Tool™ or EDT have been used to identify automatically networked equipment on telecommunication devices, such as routers, switches, and Private Branch Exchanges or PBX's. They use networking protocols and concepts, such as the Simple Network Management Protocol or SNMP, to identify the devices. Such tools, however, are unable to distinguish between stolen or malfunctioning equipment, to monitor items that do not support the networking protocols used, and peripherals, such as computer monitors, keyboards, and printers, that are not connected directly to the network. They also fail to provide accurate location information about the device.

SUMMARY OF THE INVENTION

These and other needs are addressed by the various embodiments and configurations of the present invention. The present invention is related generally to the use of a networked system of ID readers to track selected objects, such as people, office equipment, and office furniture. The distributed system of readers can communicate in real-time with a centralized management/security system.

In a first embodiment of the present invention, a method for tracking objects is provided that includes the steps of:

(a) providing an enterprise network that includes a number of subscriber communication devices (e.g., analog or digital telephones, IP hardphones, IP softphones, routers, switches, servers, and the like), each of which is in communication with a corresponding reader (e.g., an RFID transceiver and/or a bar code scanner);

(b) each reader reading a set of object identifiers (e.g., serial numbers, passwords, employee identification numbers, and the like), each object identifier in the set corresponding to an identification device (e.g., an RFID transponder or tag and/or a bar code) positioned on a respective object to be tracked; and (c) determining a physical location of each object having an object identifier that was read by a reader. The "physical location" of the tracked object is not limited to a precise physical location but can be characterized as the object being in a specified area. For example, the physical location of an object can be characterized as being somewhere within the range of a reader.

The reader may be plugged into or otherwise external to the host communication device or be incorporated or integrated into the host communication device. The former configuration is particularly useful for configuring inexpensively an existing enterprise communications network to also perform object tracking. The readers are networked with a centralized asset management or security system by using the existing network connectivity of the host communication devices. As noted, the location information received from the various, geographically dispersed readers can be used for automatically managing assets, identifying acts of theft, and providing security in restricted areas. The location information normally includes a unique identifier associated with a tracked object and a description of the current location of the identified, tracked object.

For example, inventory can be taken automatically when the communication equipment is installed. Inventory can also be identified by portable or stationary readers. The readers can be placed around a building so that notification can be provided when an inventory item is moved.

In one configuration, devices in the vicinity of a communication device contain or include a passive, semi-passive, or active RFID tag enabling them to be detected by the RFID reader in communication with the communication device and reported to the monitoring server. This configuration enables non-networked objects, such as computer monitors, computers, and telephony headsets, to be managed via the enterprise communications network where up-to-date information is relayed. The non-networked objects are fitted with RFID tags, which the RFID reader can identify. The RFID tags can be inexpensive and require little or no power. With communication devices usually spread around a building, this configuration can provide a cheap and effective way to obtain near 100% coverage of the building. It also enables monitoring of equipment in real-time, even if the equipment is moved. As all communication devices have power, they can provide an ideal place for the RFID reader. This is one of the main reasons why active RFID-type devices are not used as commonly as passive devices, though they offer a significant signal strength advantage. The configuration can also provide accurate tracking in real time using a combination of "fixed" devices. If an RFID tag is detected by multiple readers, triangulation techniques can be used to pinpoint a more accurate location of the device. Or on a simpler level, as a device is moved throughout a building it can be tracked in real-time as it passes near the installed communication device.

The present invention can have a number of advantages relative to the prior art. For instance, the invention can provide location information about objects through a centralized management system. The invention can allow non-networked devices to be managed through the networked management system. SNMP solutions cannot accurately locate a device, but only what the device is connected to. Traditional scanning systems require bulky receivers positioned at locations around the room or people to scan the tracked objects. Theft control is another advantage over traditional SNMP-based solutions. It can enable accurate determination between a device that is not responding and a device that has been stolen. Unlike current SNMP solutions, just unplugging the device does not stop a device from reporting information when the device is equipped both with a reader and an ID device, such as an RFID tag. Other readers in the nearby communication devices can receive a signal from the stolen device and report that that device has moved. The invention can provide significant cost savings over installation of a separate network of readers throughout a building.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved contact processing directed from an external network into a PBX or other communication system switch or server.

Figure 1:
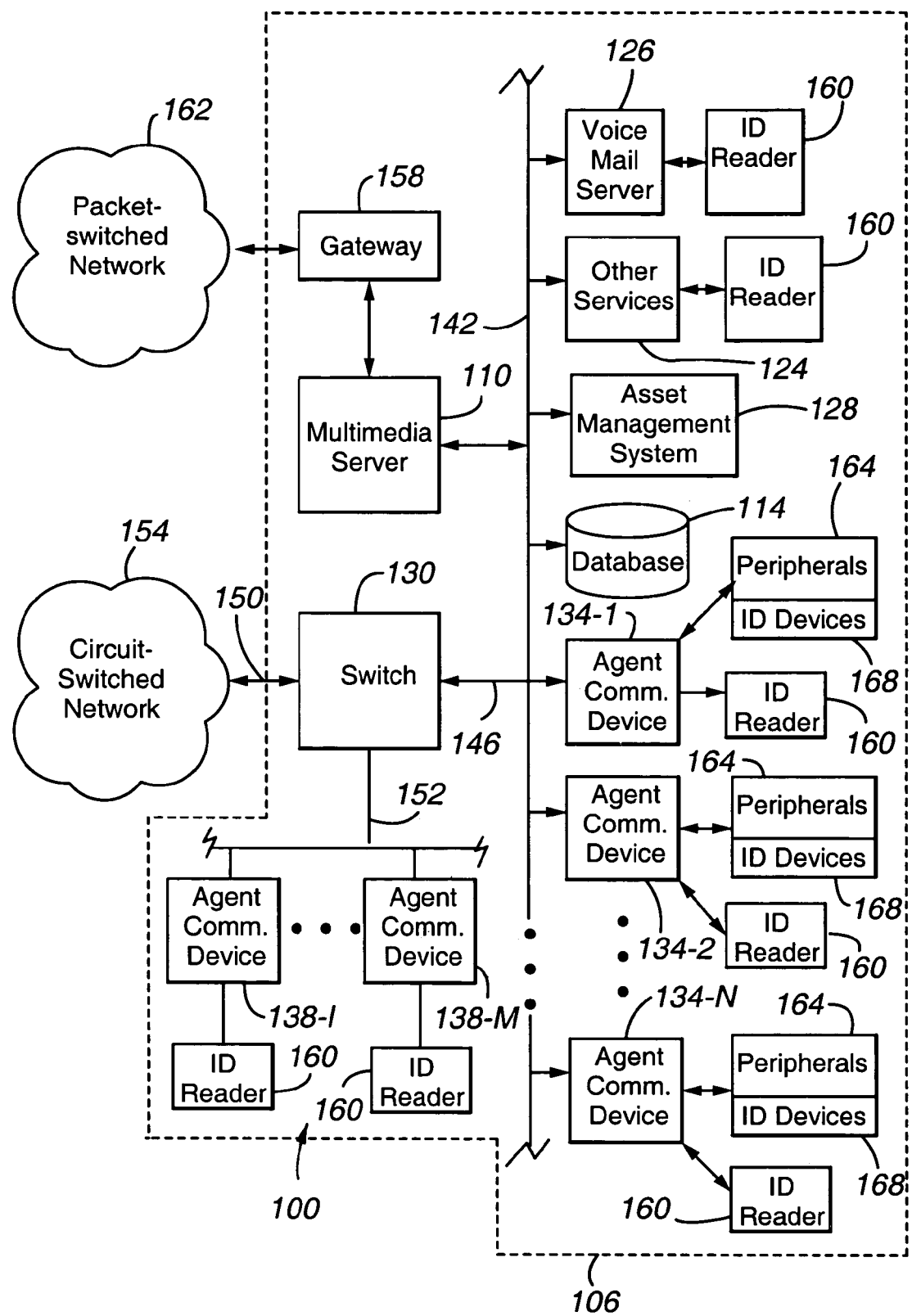
FIG. 1 is an enterprise network according to an embodiment of the present invention.

FIG. 1 shows an exemplary communication system 100 in which the invention is implemented. The system 100 includes a multi-media server 110 that serves a premises 106, including circuit-switched communication devices 138-1, . . . 138-M that are subscribers to the server 102, a Local Area Network 142 that serves a number of communication devices 134-1, 134-2, . . . 134-N that are also subscribers to the server 102, a set of data stores or databases 114 containing subscriber-related information, a plurality of servers, namely a voice mail server 126 and other servers 124, an asset management system 128, and a switch 130. Each of the devices 138-1, . . . 138M and 134-1, 134-2, . . . 134N has a corresponding internal extension. These extensions are referred to herein as "internal" in that they are extensions within the premises 106 that are directly serviced by the server. More particularly, these extensions correspond to conventional terminal endpoints serviced by the server, and the server can direct incoming calls to and receive outgoing calls from these extensions in a conventional manner. The servers can be connected via optional communication lines 146 to the switch 130. As will appreciated, the other servers 124 can also include a scanner (which is normally not connected to the switch 130 or Web server), VoIP software, video call software, an IP voice server, a fax server, a web server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

The term "server" as used herein should be understood to include a PBX, an enterprise switch, an enterprise server, or other type of telecommunications system switch or server, as well as other types of processor-based communication control devices such as computers, adjuncts, etc. Typically, the server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The server typically includes a network interface card (not shown) to provide services to the serviced telecommunication devices. By way of example, the server in the exemplary embodiment are implemented as an otherwise conventional Avaya media server (e.g., S8700™, S8300™, S8500™, IP600™) running Avaya Inc. Communication Manager™ or MultiVantage™ software. Other types of known servers are well known in the art and therefore not described in detail herein.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. The telecommunication devices 138-1, . . . 138-M can be any circuit-switched communication device including, for example, wired and wireless digital or analog telephones, PDAs, H.320 video phones and conferencing units, and voice messaging and response units.

It should be noted that the invention does not require any particular type of information transport medium between switch or server and first and second telecommunication devices, i.e., the invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

The gateway 158 can be Avaya Inc.'s, G700 Media Gateway™ and may be implemented as hardware such as via an adjunct processor (as shown) or as a chip in the server.

The LAN 142 is a conventional local area network that uses wires and/or optical fiber as a common carrier medium. It may employ any suitable protocol, with the Ethernet Protocol being preferred.

Each of the servers 126 and 124 and communication devices 134 and 138 is in communication with an IDENTIFICATION or ID reader 160, and peripheral(s) 164, such as monitors, printers, keyboards, computer mice, scanners, telephony headsets, PCMCIA devices, and communication devices themselves, and other objects (not shown), such as people, office furniture, clocks, radios, stereos, artwork, and books, each include a unique ID device 168 that communicates with an adjacent ID reader to locate the corresponding object. The ID reader and ID device can be based on any number of suitable technologies. For example, the ID reader can be a scanner and the ID device a bar code, the ID reader a magneto-acoustic reader and the ID device a magneto-acoustic tag, and the ID an RFID transceiver and the ID device an RFID tag. Preferably, the ID reader emits electromagnetic radiation. More preferably, the reader is an RFID transceiver and the ID device a passive, semi-passive, or active RFID tag. Even more preferably, the RFID transceiver and tag apply the GTag standard and/or ISO 18000-6.

The ID reader 160 can be connected, but external, to the corresponding host device or integrated into the host device. In the former case, the external reader is in wireless or wired communication with the device via a port and commands are passed to the reader from the querying computational component. In the latter case, the reader is internal to the device and is queried directly by the device itself.

Figure 3:
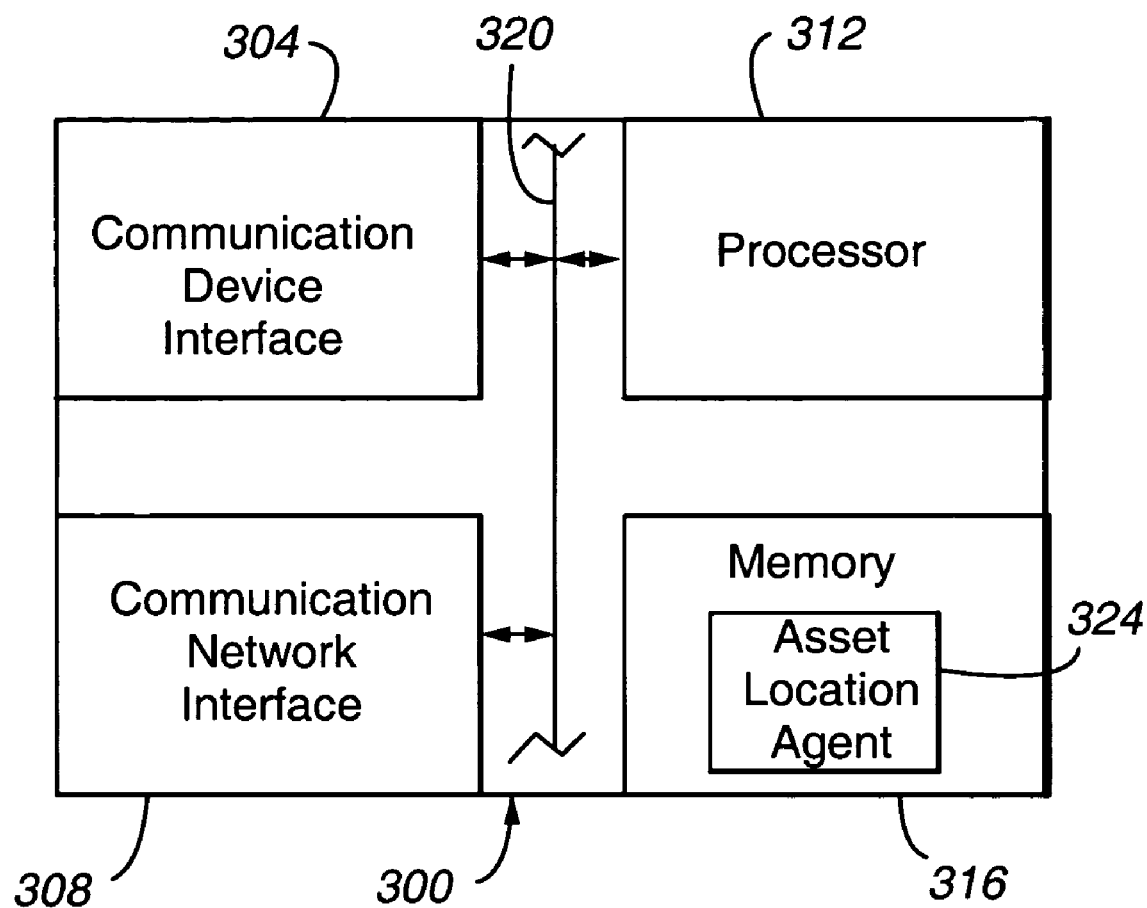
FIG. 3 is a block diagram of a multimedia server according to an embodiment of the present invention.

With reference to FIG. 3, the servers 300 each include a number of interfaces, including a communication device interface 304 and a communication network interface 308, a processor 312, and a memory 316. The various components may be interconnected to one another by an internal bus 320. The communication device interface 304 type is determined by the interconnection between the communication device and the server. For example, when the interconnection between the communication device and the server is a packet-data type network, the interface may include a packet data interface. When the interconnection is an analog interconnection, the interface may include a tip-ring type interface. The communication network interface interconnects the server to one of the networks 154 and 162. If the interface interconnects the server to the network 154, the interface 308 is configured as a circuit-switched analog or digital interface, and, if the interface interconnects the server to the network 162, the interface 308 is configured as a packet-switched interface. In the architecture 100, the server 300 will include two such interfaces 308, one for the network 154 and one for the network 162.

The processor 312 generally operates to execute instructions, for example stored in the associated memory 316 or memory integral to the processor 312. Accordingly, the processor may include a general purpose programmable processor, Digital Signal Processor or DSP, or controller. The processor may implement functions represented by the user configuration agent 324 described below.

The memory 316 may store instructions, such as those represented by the agent 324, for controlling operation of the processor. The memory may include any data storage device, such as a solid state memory, a hard disk drive, or read only memory. As will be appreciated, the processor and memory may be implemented as an integrated controller-type device. The server may include additional elements that are omitted from FIG. 3 for simplicity and clarity of illustration. For example, the server may include an external database to store system configuration information, a gateway, a gatekeeper, a multipoint control unit, a registrar, a proxy server, a redirect server, service circuits such as tone generators, announcement circuits, etc., and a port card for each type of user communication device associated therewith. Also associated with the server may be an administrator terminal (not shown) which is used to program the operation of the switch/server during system administration, e.g., an initial set-up and configuration of the system of a subsequent system-level or user-level configuration. Other devices not shown in the figures may be associated with the server, such as an adjunct feature server. Such an adjunct server may be physically incorporated within the server and may be partially or completely implemented using other server elements such as the processor 312 and memory 316.

The agent 324 interfaces with the readers 160 via the host device and obtains object location information. The host device provides network connectivity so that the reader 160 can communicate with the server 110 and/or asset management system 128. The collected information can provide a number of functions, including asset management (where is the asset at any point in time), automatic theft notification (when the asset is identified as leaving a specified area), and personnel location (where is the employee at any point in time). The location of readers on a number of spatially located networked host devices can provide comprehensive coverage to a large area, such as a multi-storied office building, at a relatively low expense because existing network resources are being used to support the system.

Figure 2:
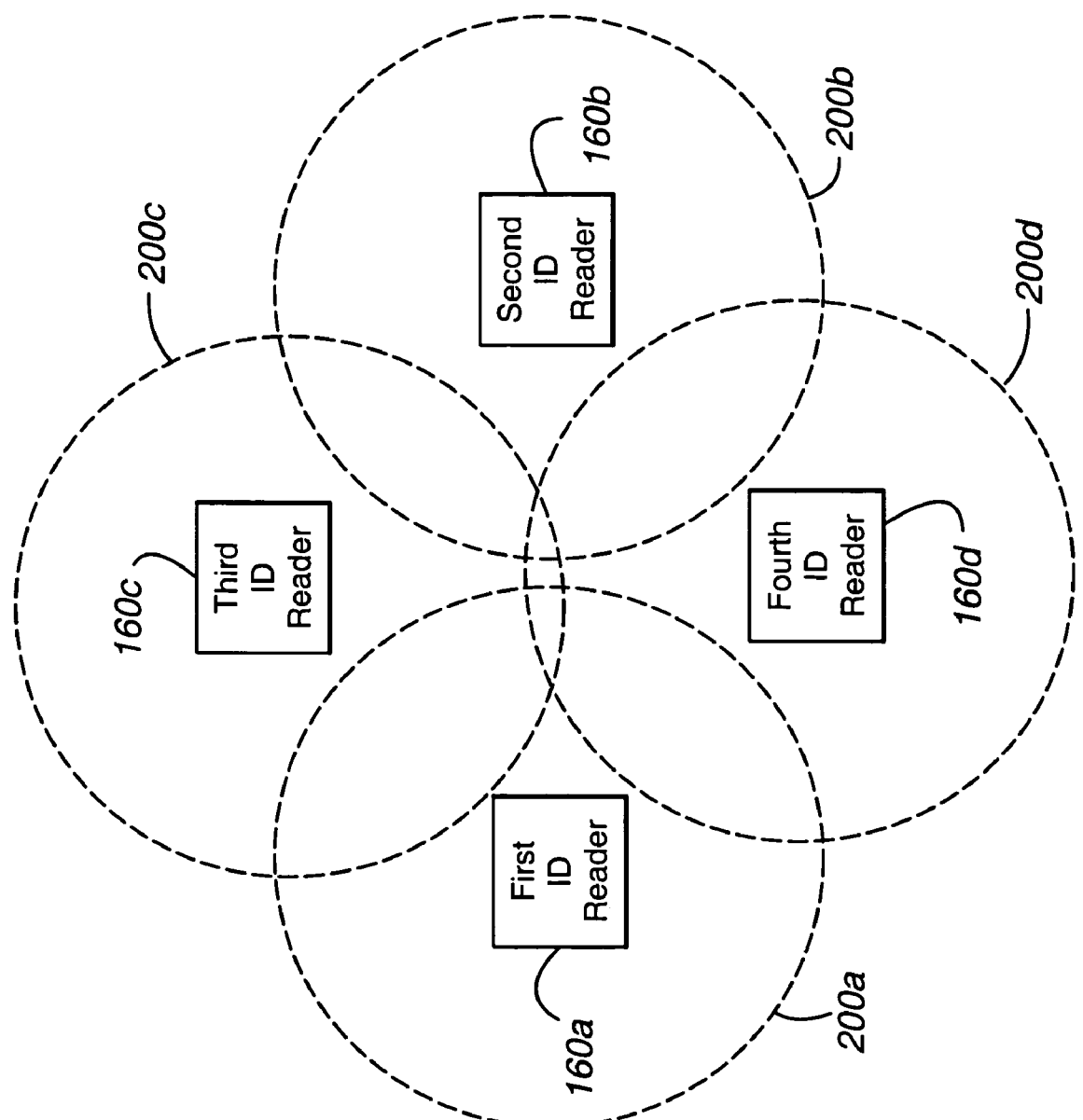
FIG. 2 is a block diagram depicting a plurality of ID readers.

An example of the benefits of a networked automatic identification system is depicted in FIG. 2. First, second, third and fourth ID readers 160a–d, respectively, have corresponding ranges 200a–d. In other words, a reader can obtain object location information from an ID device positioned within the reader's respective range. The precise location of an object can be determined based on the overlapping ranges and/or the use of triangulation techniques. For instance, if an object having an associated ID device is positioned in the overlapping ranges 200a and d, the agent 324 would know the location of the tracked object with greater resolution than simply being somewhere within the entire range of either the first or fourth ID reader. If the object were in the area of overlap among ranges 200b–d, the location of the tracked object could be determined with an even higher degree of precision. The failure of an adjacent second reader to read a tag currently being read by a first reader can also be used to identify where the corresponding object is and is not located.

The ability of ID readers within overlapping ranges to mutually interfere with one another can be controlled using a technique, such as Time Division Multiple Access or TDMA. In simple terms, the readers are instructed to read at different time intervals rather than during the same time interval. TDMA thus obviates reader collision.

Problems caused by tag collision caused by the simultaneous presence of a number of ID devices in the range of a reader can be overcome as well. As well be appreciated, tag collision occurs when more than one ID device reflects back a signal at the same time, confusing the reader. The tags can be configured so that they respond to the reader one-at-a-time. Because the time required to read a tag is in milliseconds, it appears to the user for all practical purposes as if all of the tags are being read simultaneously.

The range of a typical RFID tag depends on many factors, including the frequency of operation, the power of the reader, and interference from metal objects or other RF devices. Generally, low-frequency passive tags are read from about three feet and UHF passive tags are read from about 10 to 20 feet. Where longer distances are needed, active tags can be used.

Other techniques can be used to facilitate object location with a high degree of precision. In one example, the host communication devices are connected in the LAN 142 to a plurality of Ethernet switches. Each device has a corresponding Media Access Control or MAC address. The Ethernet switches are cabled to wall jacks in specific rooms or cubicles. The server maintains an auto or manual entry table with a mapping of communication device extension to MAC address and Ethernet switch and port to physical location (such as wall jack location), e.g., switch 12sw–a4 comprises port 7, which in turn corresponds to building A, floor 4, aisle C, cube 10. In another example, the communication device's IP address is used for object location. IP addresses are grouped into networks or sub-networks. As will be appreciated, a "subnet" is a common term used to describe a grouping of IP addresses. It is a common practice to assign a subnet of IP addresses to a relatively tight geographic region. For example, an IP subnet could be assigned to a given floor in an office building or one wing of a given floor. In yet another example, the extension of the communication device is used to provide object location information by mapping extension against physical location of the communication device. In many applications, the communication device having a designated extension is stationary. The administered location for the communication device corresponding to an extension can therefore be used to provide object location information.

Figure 4:
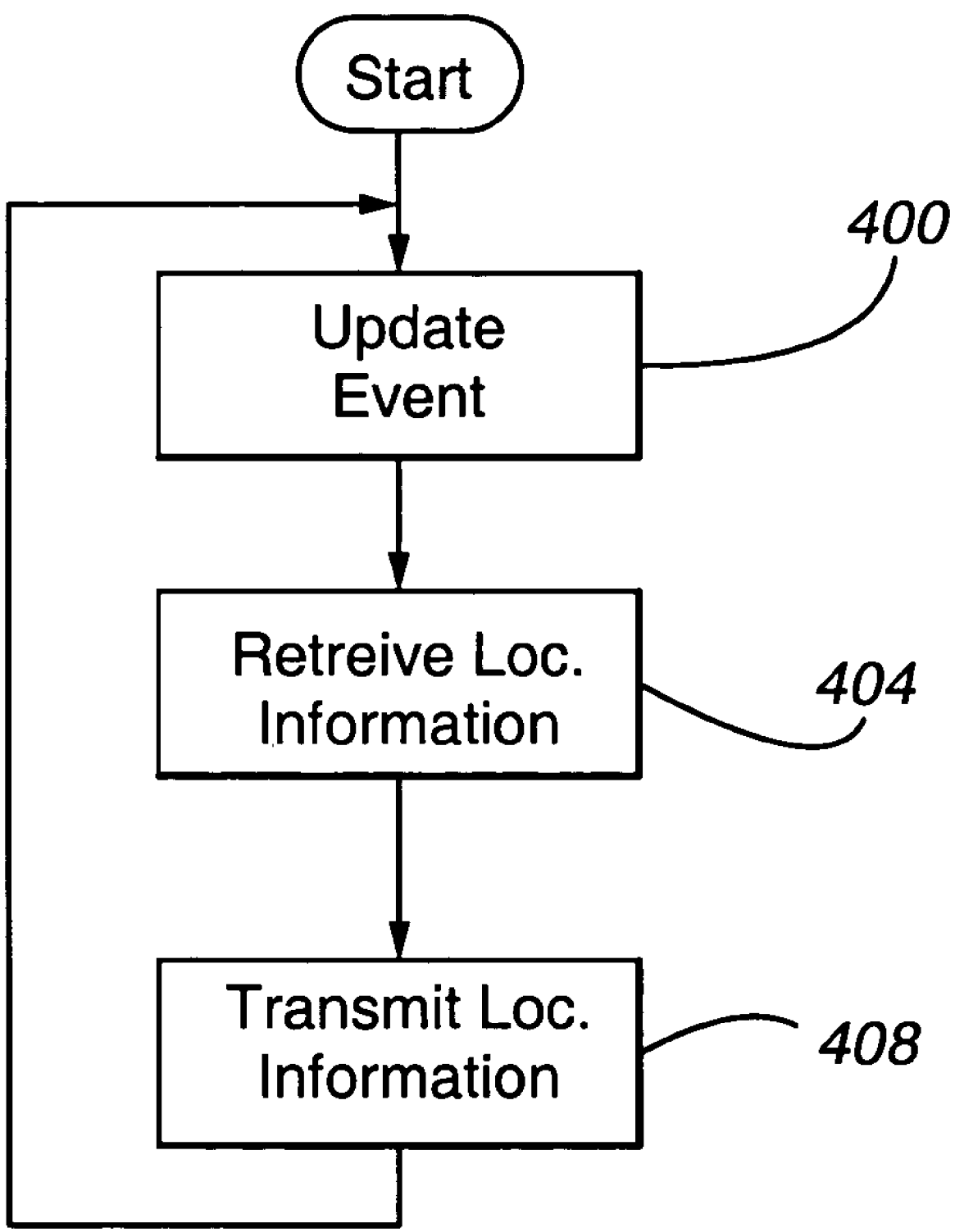
FIG. 4 is an operational flow chart of the asset location agent according to an embodiment of the present invention.

The operation of the agent 324 will now be described with reference to FIG. 4.

In step 400, an update event occurs. The update event can be any number of selected events. For example, the update event can be the receipt of an object location request from the asset management system 128. It may be the passage of a period of time. In other words, the object location information is provided to the system 128 at periodic intervals. It may be when the last recorded location of an object changes. For instance, an object may move outside of the range of a first reader and/or enter the range of a second reader. This can be determined by comparing a first listing or set of previously recorded reader identifiers corresponding to the readers that could read the selected ID device against a second listing or set of currently recorded reader identifiers corresponding to the readers that are currently reading the selected ID device. A difference in the first and second listings means that the object has moved.

The listing of what ID devices are currently being read by each reader can be obtained by a number of techniques. For example, packet-switched communication devices can provide the information to the agent 324 using a query/response protocol, such as SNMP. Circuit-switched communication devices can communicate location information using a modified protocol, such as a modified version of QSig (ITU standard) or the CCMS proprietary protocol of Avaya Inc. A new message would be used to transmit the location information as a series of Dual Tone Multi-Frequency or DTMF signals from the communication device to the server/asset management system.

In step 404, the agent 324 retrieves the object location information for a set of objects or a selected object. The location information can be a listing of the reader identifiers that are able to read currently the ID device and/or an object-by-object current physical location. The physical location can be determined using one or more of the techniques described above.

In step 408, the location information is forwarded to the asset management system 128.

A number of variations and modifications of the invention can be used. It would be possible to provide for some features of the invention without providing others.

For example in one alternative embodiment, the agent 324 is in each of the communication devices as well as or in lieu of being in the server.

In another alternative embodiment, the agent 324 is embodied in hardware, such as an Application Specific Integrated Circuit or ASIC or other type of logic circuit, or as a combination of hardware and software.

In another alternative embodiment, the readers are configured to have substantially overlapping ranges. Each communication device has a reader and an ID device. When a communication device goes down or appears to malfunction, the server can query an adjacent reader whether or not it is able to read the ID device of the apparently malfunctioning device. In this way, the server can determine quickly whether the device indeed malfunctioned or has been removed from its provisioned location.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for tracking objects, comprising:
    providing an enterprise network, comprising a plurality of interconnected subscriber communication devices, each of the communication devices being in communication with a corresponding reader and configured to effect interpersonal communications;
    each reader reading a respective set of object identifiers, each object identifier in the set corresponding to an identification device positioned on a respective object, wherein the respective set of read object identifiers and a respective identifier of the corresponding communication device form object location information;
    the communication devices transmitting the corresponding object location information through the enterprise network to an asset management system; and
    from the respective communication device identifier, the asset management system determining a physical location of each object having an object identifier in at least one of the sets of object identifiers and wherein an object associated with a selected object identifier is operationally unrelated to the communication device reading the selected object identifier.

2. The method of claim 1, wherein each reader is a radio frequency identification or RFID transceiver and each identification device is an RFID transponder and wherein an object associated with a selected object identifier is not part of the enterprise network.

3. The method of claim 1, wherein the object is one of a computer monitor, a computer keyboard, a computer printer, a computer mouse, a subscriber communication device other than the communication device corresponding to the reader, a chair, a desk, a bookshelf, a credenza, a book, a stereo, a picture, a person, a clock, a radio, artwork, and telephony headset.

4. The method of claim 1, wherein the determining step comprises:
    determining that an object has an object identifier in at least first and second sets of object identifiers, the first and second sets corresponding to adjacent first and second readers; and
    determining that the physical location is where a first range of the first reader overlaps a second range of the second reader.

5. The method of claim 1, wherein the determining step comprises:
    determining that an object has an object identifier in a first but not a second set of object identifiers, the first and second sets corresponding to adjacent first and second readers; and
    determining that the physical location is within a first range of the first reader and outside of a second range of the second reader, wherein the first and second ranges overlap.

6. The method of claim 4, wherein, in the reading step, the first and second readers read object identifiers at different times.

7. The method of claim 1, wherein, in the reading step, each object identifier within the range of a reader provides at different times a corresponding object identifier to the reader.

8. The method of claim 1, wherein the determining step comprises:
    determining the physical location of the first object from the identifier, wherein the identifier is at least one of an extension, an IP address, a switch identifier, a port identifier, and a Media Access Control or MAC address of a first communication device in communication with a first reader, wherein a first object identifier of the first object is read by the first reader.

9. The method of claim 8, wherein the at least one of an extension, an IP address, a switch identifier, a port identifier, and a Media Access Control or MAC address is the extension of the first communication device.

10. The method of claim 8, wherein the at least one of an extension, an IP address, a switch identifier, a port identifier, and a Media Access Control or MAC address is the IP address of the first communication device.

11. The method of claim 8, wherein the at least one of an extension, an IP address, a switch identifier, a port identifier, and a Media Access Control or MAC address is the switch identifier of the switch to which the first communication device is connected.

12. The method of claim 8, wherein the at least one of an extension, an IP address, a switch identifier, a port identifier, and a Media Access Control or MAC address is the port identifier of the port to which the first communication device is connected.

13. The method of claim 8, wherein the at least one of an extension, an IP address, a switch identifier, a port identifier, and a Media Access Control or MAC address is the MAC address of the first communication device.

14. The method of claim 1, wherein a first reader corresponds to a first communication device, a second reader corresponds to a second communication device, the first reader has a first range, the second reader has a second range, the first and second ranges overlap, and the second range includes the position of the first reader and further comprising:
   when the first communication device is nonresponsive, requesting the second reader to read the object identifier of the first communication device to determine if the first communication device has moved.

15. A computer readable medium comprising processor executable instructions to perform the steps of claim 1.

16. A logic circuit operable to perform the steps of claim 1.

17. An enterprise network for tracking objects, comprising:
   a plurality of interconnected subscriber communication devices configured to effect interpersonal communications;
   a plurality of readers, each of the communication devices being in communication with a corresponding reader, wherein each reader is operable to read a respective set of object identifiers, each object identifier in the set corresponding to an identification device positioned on a respective object, wherein the respective set of read object identifiers and a respective identifier of the corresponding communication device form object location information; and
   a location agent in an asset management system operable to receive object location information from each of the communication devices and determine, from the respective set of object identifiers and the communication device identifier, a physical location of each object having an object identifier in the respective set of object identifiers and wherein an object associated with a selected object identifier is operationally unrelated to the communication device reading the selected object identifier.

18. The network of claim 17, wherein each reader is a radio frequency Identification or RFID transceiver and each Identification device is an RFID transponder.

19. The network of claim 17, wherein the object is one of a computer monitor, a computer keyboard, a computer printer, a computer mouse, a subscriber communication device other than the communication device corresponding to the reader, a chair, a desk, a bookshelf, a credenza, a book, a stereo, a picture, a person, a clock, a radio, artwork, and telephony headset.

20. The network of claim 17, wherein the determining operation comprises the suboperations of:
   determining that an object has an object identifier in at least first and second sets of object identifiers, the first and second sets corresponding to adjacent first and second readers; and
   determining that the physical location is where a first range of the first reader overlaps a second range of the second reader.

21. The network of claim 17, wherein the determining operation comprises the suboperations of:
   determining that an object has an object identifier in a first but not a second set of object identifiers, the first and second sets corresponding to adjacent first and second readers; and
   determining that the physical location is within a first range of the first reader and outside of a second range of the second reader, wherein the first and second ranges overlap.

22. The network of claim 20, wherein, in the reading operation, the first and second readers read object identifiers at different times and wherein an object associated with a selected object identifier is not part of the enterprise network.

23. The network of claim 17, wherein, in the reading operation, each object identifier within the range of a reader provides at different times a corresponding object identifier to the reader.

24. The network of claim 17, wherein the determining operation comprises the suboperations of:
   determining the physical location of the first object from the identifier wherein the identifier is at least one of an extension, an IP address, a switch identifier, a port identifier, and a Media Access Control or MAC address of a first communication device in communication with a first reader, wherein a first object identifier of the first object is read by the first reader.

25. The network of claim 24, wherein the at least one of an extension, an IP address, a switch identifier, a port identifier, and a Media Access Control or MAC address is the extension of the first communication device.

26. The network of claim 24, wherein the at least one of an extension, an IP address, a switch identifier, a port identifier, and a Media Access Control or MAC address is the IP address of the first communication device.

27. The network of claim 24, wherein the at least one of an extension, an IP address, a switch identifier, a port identifier, and a Media Access Control or MAC address is the switch identifier of the switch to which the first communication device is connected.

28. The network of claim 24, wherein the at least one of an extension, an IP address, a switch identifier, a port identifier, and a Media Access Control or MAC address is the port identifier of the port to which the first communication device is connected.

29. The network of claim 24, wherein the at least one of an extension, an IP address, a switch identifier, a port identifier, and a Media Access Control or MAC address is the MAC address of the first communication device.

30. The network of claim 17, wherein a first reader corresponds to a first communication device, a second reader corresponds to a second communication device, the first reader has a first range, the second reader has a second range, the first and second ranges overlap, and the second range includes the position of the first reader and wherein the location agent is operable, when the first communication device is nonresponsive, to request the second reader to read the object identifier of the first communication device to determine if the first communication device has moved.

* * * * *